(12) United States Patent
Schobinger et al.

(10) Patent No.: US 7,220,105 B2
(45) Date of Patent: May 22, 2007

(54) ORNAMENTAL WIND TURBINE APPARATUS

(76) Inventors: Gene Schobinger, P.O. Box 44, Gardner, ND (US) 58036; Kathie Schobinger, P.O. Box 44, Gardner, ND (US) 58036

( * ) Notice: Subject to any disclaimer, the term of this patent is extended or adjusted under 35 U.S.C. 154(b) by 72 days.

(21) Appl. No.: 10/969,336

(22) Filed: Oct. 20, 2004

(65) Prior Publication Data
US 2006/0083616 A1   Apr. 20, 2006

(51) Int. Cl.
    *F03D 11/00* (2006.01)
(52) U.S. Cl. .................. 416/146 R; 416/176
(58) Field of Classification Search ............ 416/146 R, 416/176; 415/72; D11/129, 131
    See application file for complete search history.

(56) References Cited

U.S. PATENT DOCUMENTS

| 1,162,230 A | 11/1915 | Foster |
| 1,549,110 A | 8/1925 | Greger |
| 1,669,748 A | 5/1928 | Greger |
| D110,858 S | 8/1938 | Egerton |
| D115,913 S | 8/1939 | Crandall |
| 2,395,578 A | 2/1946 | Pergande |
| 2,510,336 A | 6/1950 | Donahue |
| D189,038 S | 10/1960 | Allen |
| 3,475,850 A | 11/1969 | Hop Le |
| 3,747,263 A | 7/1973 | Grossberg |
| D253,776 S | 12/1979 | Molenaar |
| 4,637,941 A * | 1/1987 | Rochte .................... 428/8 |
| D294,012 S | 2/1988 | Patricko |
| D294,128 S * | 2/1988 | Patricko .............. D11/129 |
| 4,746,022 A | 5/1988 | Benham |
| 4,884,328 A | 12/1989 | Neighbors |
| 5,083,963 A | 1/1992 | Lin |
| 5,130,169 A | 7/1992 | DeJaynes |
| 5,290,001 A | 3/1994 | Jones |
| 5,336,536 A | 8/1994 | Oberzan |
| 5,659,988 A | 8/1997 | Kim et al. |
| 5,727,980 A | 3/1998 | Stipa |
| D409,414 S | 5/1999 | Weiner |
| 6,042,903 A | 3/2000 | Yedlin et al. |
| 6,048,590 A | 4/2000 | Phillips |
| 6,074,268 A | 6/2000 | Uenishi |
| 6,139,168 A | 10/2000 | Gary et al. |
| 6,364,732 B1 | 4/2002 | Wu |
| 6,398,615 B1 | 6/2002 | Wu et al. |
| 6,422,913 B1 | 7/2002 | Trejo |
| D472,183 S | 3/2003 | Flohe |
| 6,588,679 B1 | 7/2003 | King |
| D497,833 S * | 11/2004 | Lach ..................... D11/131 |
| 2003/0138575 A1 | 7/2003 | Flohe |

FOREIGN PATENT DOCUMENTS

| CA | 443700 | 8/1947 |
| CA | 494878 | 7/1953 |

(Continued)

*Primary Examiner*—Ninh H. Nguyen
(74) *Attorney, Agent, or Firm*—Curtis V. Harr (57) ABSTRACT

This three dimensional ornament is designed to be suspended in outdoor situations where it is free to rotate in the wind and thereby enhance the aesthetic qualities of the area in which it is deployed and to make the wind velocity visible. The ornament is a turbine type section with an open interior section that may be filed with various decorative plates or spirals.

17 Claims, 7 Drawing Sheets

FOREIGN PATENT DOCUMENTS

| | | |
|---|---|---|
| CA | 721012 | 11/1965 |
| CA | 28445 S | 7/1966 |
| CA | 1048781 | 2/1979 |
| CA | 46363 S | 12/1979 |
| CA | 1097301 | 3/1981 |
| CA | 1132348 | 9/1982 |
| CA | 2191263 | 5/1998 |
| CA | 91089 S | 12/2000 |
| CA | 2345822 | 10/2001 |
| DE | 2523767 A1 | 5/1975 |
| FR | 2482438 A1 | 5/1980 |
| FR | 2640551 A1 | 12/1988 |
| GB | 2065481 A1 | 7/1981 |

\* cited by examiner

ORNAMENTAL WIND TURBINE APPARATUS

BACKGROUND OF THE INVENTION

The present invention relates to an improvement in the design of three dimensional decorative ornaments. More specifically, to a method of building these three dimensional ornaments in a manner so that they are made up of an outside design element which is constructed to both enhance the overall aesthetics of the invention and to provide the mechanism by which it rotates in the wind and an internal element that has decorative purposes.

Decorative ornaments are commonly employed to enhance the appearance or to personalize living or work space. In the recent past, the use of specialized ornaments in outdoor situations has also become increasingly popular. Some examples of this later use of such devices are wind chimes, weather vanes having decorative elements incorporated into their designs, reflective globes, and hanging three dimensional ornaments designed to freely spin in the wind. The general purpose of all of these different ornaments is to add a personal decorative touch to outdoor spaces such as gardens and yards and to aid in making the wind velocity visible.

The three dimensional wind ornaments have become very popular in the recent past as they add a degree of motion as well as color into the desired setting. These types of ornaments are generally constructed out of a plurality of concentric circles, or other simple geometric shapes, which are joined together at a central spine at progressing compass degrees. This method of construction results in an ornament that, when rotated by wind or other mechanical method, results in an ornament that visually changes during the rotation process. Additionally, these ornaments are also constructed of a material that catches and reflects light in a way that greatly enhances these visual effects.

Another problem inherent to these types of three dimensional ornaments is that their design incorporating many different surfaces often results in a visual appearance that is overly busy or too complex to be aesthetically pleasing. Additionally, the design of these ornaments also does not lend itself to the incorporation of ancillary design elements such as representations of common animals, birds or the like. The incorporation of these additional design elements can add a great deal to these three dimensional ornaments and this limitation of the available designs unnecessarily diminishes the potential size of the market in this area.

From the foregoing discussion it can be seen that it would be desirable to provide a three dimensional ornament for the purpose of enhancing the look of outside spaces that is designed in such a manner so that the passage of wind will cause it to rotate changing its overall appearance in a continual fashion. Additionally, it can be seen that it would be desirable to provide such a three dimensional ornament which is designed in a aesthetically simple manner to provide the desired visual stimulus to the location in a manner that is not overwhelming. Finally, it can also be seen that it would be desirable to provide such a three dimensional ornament that provides a base both functionally and aesthetically for the incorporation of ancillary design elements into the ornament.

SUMMARY OF THE INVENTION

It is the primary objective of the present invention to provide a three dimensional ornament that will freely rotate with the passage of wind in a manner so that it will continually change its external appearance.

It is an additional objective of the present invention to provide such a three dimensional ornament which is constructed with an overall simplicity of design so that it retains a proper degree of aesthetically pleasing qualities without being visually overwhelming.

It is a further objective of the present invention to provide such a three dimensional ornament that provides a base both functionally and aesthetically for the incorporation of ancillary design elements into the ornament.

These objectives are accomplished by the production of a three dimensional ornament that, in this contemplated embodiment, incorporates four external body elements known as turbine arms to form its three dimensional shape. The use of four of these turbine arms is conducive to the construction of the present invention, however other numbers of turbine arms are possible. For the purposes of simplicity, the construction of the present invention with four turbine arms and the attributes related thereto will be discussed herein.

These turbine arms are generally strips of the construction material which are tied together in a specific manner to form the present invention. The turbine arms are formed by cutting a strip from a flat plate of construction material which is accomplished by cutting a blank from the sheet of construction material which resembles a flower petal or four leaf clover. This blank is composed primarily of the four turbine arms which individually resemble the letter C with its upper end extending in a straight line for a short distance. Thus, the four illustrated turbine arms can be cut from a single flat sheet of construction material (the preferred method of construction) so that their bases are all connected by a square-shaped base and the elongated C-shapes extending outwardly from this base at ninety degree intervals.

After the turbine arms are cut as described above, the tip of each of them (or the lower end of the C) is forced both rearwards and upwards thereby twisting the lower portion of the C resulting in a configuration resembling a reversed question mark when viewed from the side. The resulting upper portions of each of the turbine arms are then tied together to form the upper surface of the present invention. The connection is accomplished by passing a threaded stud through the tips of the turbine arms and securing a nut onto it on either side. The threaded stud is also generally equipped with a closed eyelet on its upper most end which is in turn used to suspend the invention in the desired location.

This method of construction results in a three dimensional ornament generally being composed of the four turbine arms forming an outer shell that encloses an interior space. The turbine arms also serve to function in much the same manner as the vanes on the wind turbines commonly employed to provide ventilation in that they contain surfaces specifically designed to catch any present wind which in turn imparts the desired rotational motion to the present invention.

The interior space defined by the turbine arms also provides the present invention with another opportunity to enhance its aesthetic effect by placing additional design elements within the interior. This is most commonly accomplished by the inclusion of a central design element that is attached to the lower surface of the threaded bolt and which extends down into the interior space. The overall shape of the central design element can be one of any number of geometric shapes but for the purposes of simplicity it is illustrated here as a circular outer ring enclosing an additional open ring space. This ring space is in turn employed to incorporated such design elements as the silhouettes of birds and animals, spirals, or any other object that lends itself to this sort of artwork.

Finally, the eyelet described above that is a portion of the threaded bolt is used to suspend the present invention in the desired location. This is most commonly accomplished with the use of a swivel attachment apparatus but it can also be suspended by any number of ways including a simple string and knot. The use of the swivel apparatus provides two benefits. The first of these is ease in mounting the present invention as these swivel apparatuses commonly are equipped with a clip specifically designed for the easy attachment of ancillary items to te swivel. Secondly, the swivels also come equipped with a bearing component that allows on component of the swivel to freely rotate with respect to the other. This rotation ability allows the present invention to spin in the wind without any encumbrance from its attachment which adds to the overall visual effect that is provided by the present invention.

For a better understanding of the present invention reference should be made to the drawings and the description in which there are illustrated and described preferred embodiments of the present invention.

DESCRIPTION OF THE PREFERRED EMBODIMENT

Figure 1:
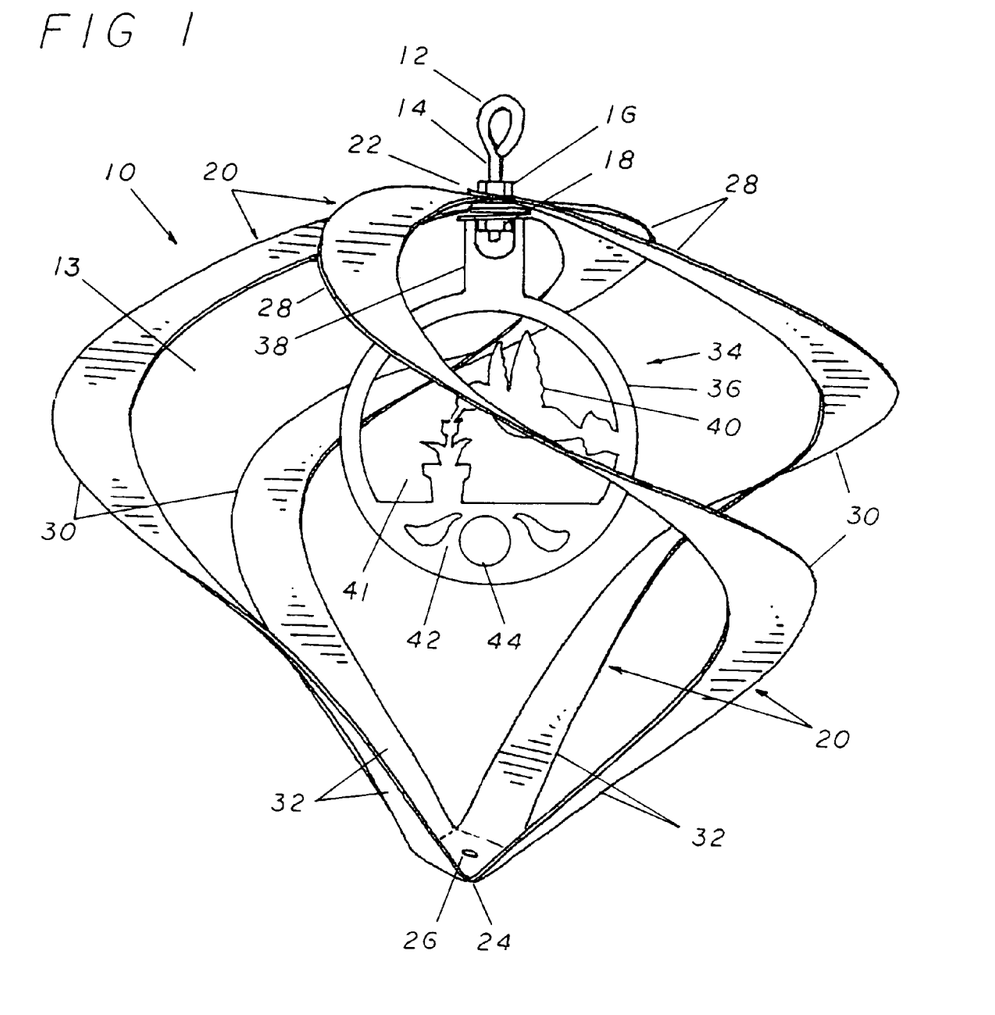
FIG. 1 is a perspective view of the wind turbine ornament illustrating the manner in which the invention is constructed and containing a hummingbird and flower central design element.
Figure 2:
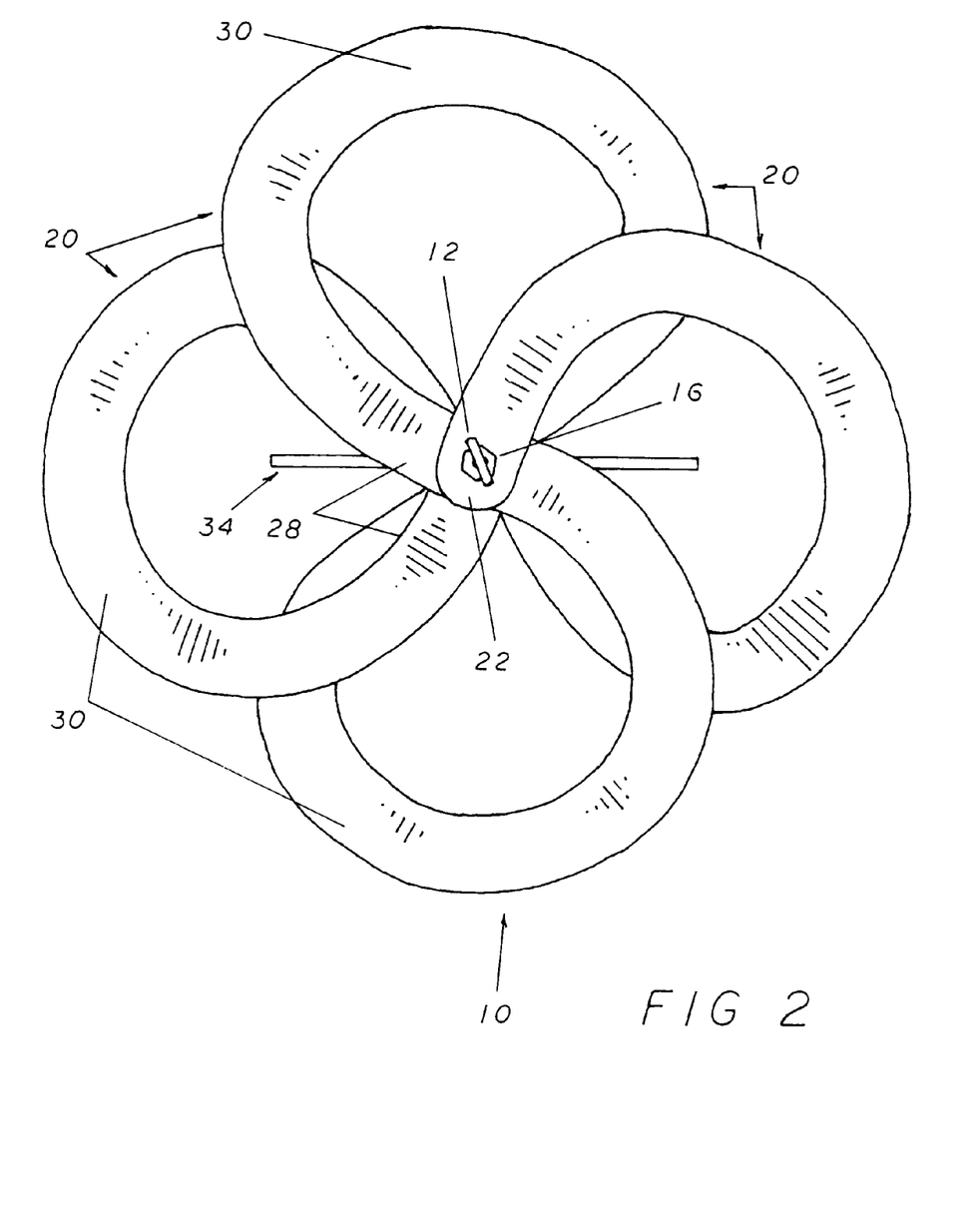
FIG. 2 is a top elevation view of the present invention of FIG. 1.
Figure 3:
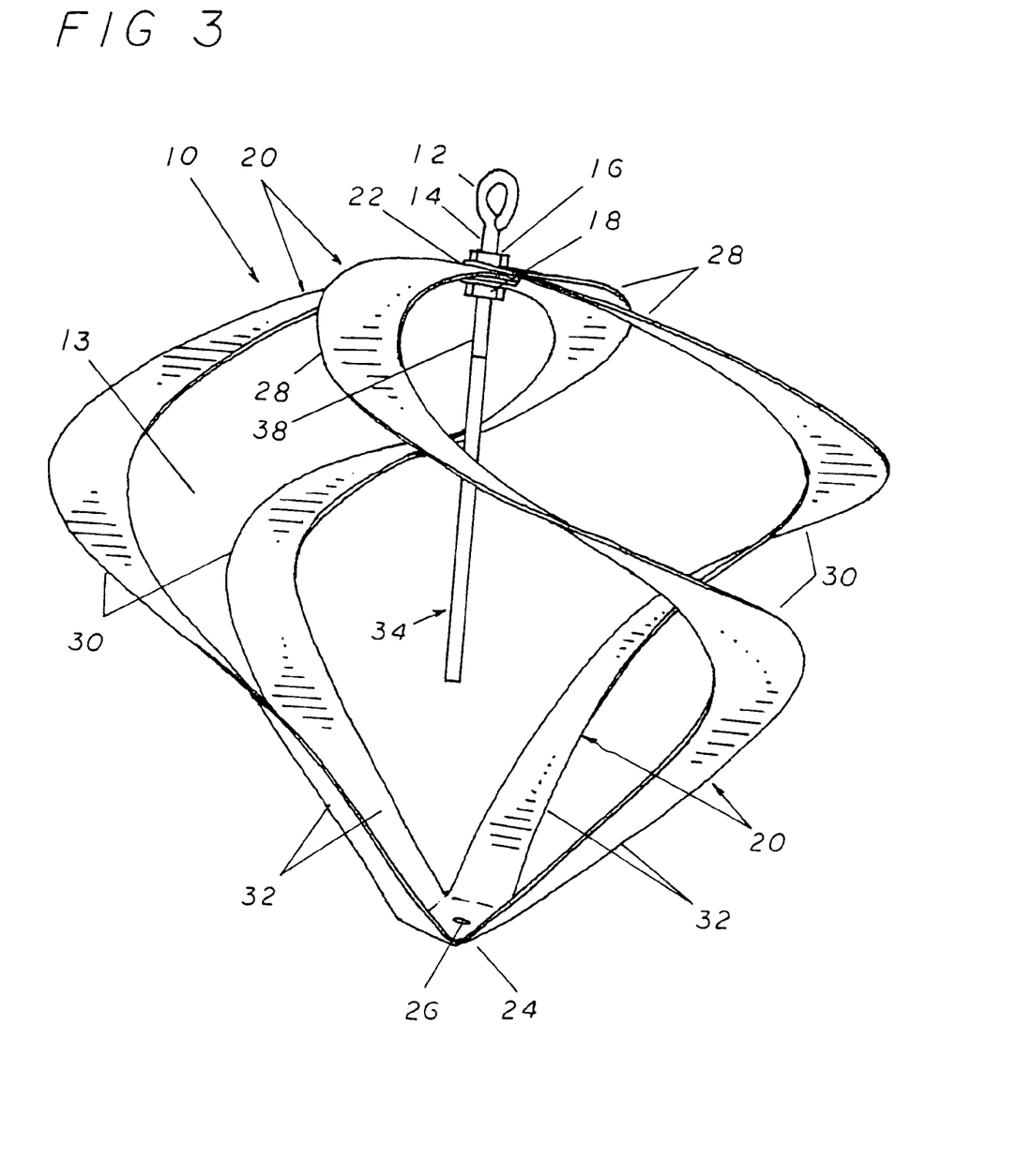
FIG. 3 is a side elevation view of the present invention of FIG. 1.

Referring now to the drawings, and more specifically to FIGS. 1, 2, and 3, the ornamental wind turbine 10 is a three dimensional apparatus of a decorative intent. As such, the present invention is made up of three main components: the outer shell 11 defining the outer dimensions of the invention and being constructed in a manner so that it adds aesthetic and functional qualities to the invention; the interior space 13 or that area enclosed by the outer shell 11; and the central design element 34 contained within the interior space 13.

The outer shell 11 of the present invention is made up of a plurality (generally four) of turbine arms 20. The turbine arms 20 are generally flat strips cut from a flat sheet of any suitable material such as metal which are cut into a specific shape dictated by the final design that is being produced. Consequently, these shapes may vary drastically while remaining within the scope of the present invention and are too numerous to disclose individually. However, for the purpose of simplicity this text will describe one of the varieties of possible designs exclusively.

In the construction of the present invention, the turbine arms 20 are all cut from a single sheet of construction material. With the offered design, this is accomplished by cutting a turbine blank 17, illustrated in FIG. 7, from the sheet of construction material which resembles a flower petal or four leaf clover. This turbine blank 17 is composed primarily of the four turbine arms 20 which individually resemble the letter C with its upper end extending in a straight line for a short distance. The overall configuration of the present invention in this preliminary state as illustrated in this FIGURE shows the individual turbine arms 20 forming the described petal shape and having the straight lower arms 32 meet at the lower confluence 24. The meeting of the individual lower arms 32 at the lower confluence 24 occurs in a manner so that they are oriented at ninety degrees from one another thereby forming a centrally positioned base 26 between them.

Figure 7:
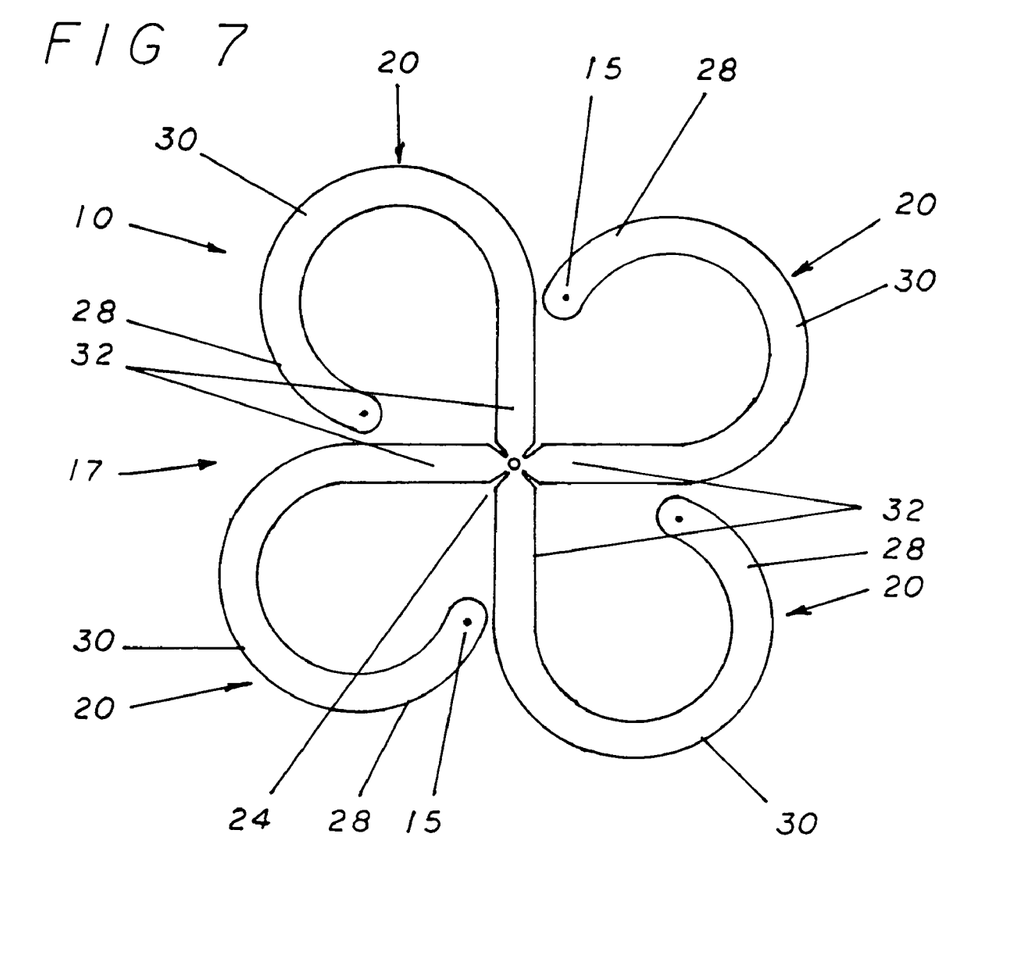
FIG. 7 is a top elevation view of the turbine blank component of the present invention illustrating the orientation of the turbine arms in this configuration.

The formation of the present invention from the formation formed by the above process is accomplished by taking the tip of each of turbine arms 20, or that terminus located at lower portion of the C, and forcing both upwards and towards the overall centerline of the present invention. This action twists the wind surface 30 portion of the turbine arms 20 resulting in a configuration resembling a reversed question mark when viewed from the side and forming the turbine arms 20 as illustrated. This action brings the tips of the upper arms 28 together where they are tied together by the use of the shaft holes 15 to complete the formation of the present invention.

The connection accomplished at the upper confluence 22 is facilitated by the use of the threaded shaft 14. The threaded shaft 14 passes through the shaft holes 15 in each of the upper arms 28 of the turbine arms 20 and is held there in place by the positioning of the lower nut 18 below the upper confluence 22 and the upper nut 16 above it. The upper and lower nuts, 16 and 18, are then tightened along the threaded shaft 14 which in turn has on its upper most portion a hanging hook 12. The hanging hook 12 is a circular extension of the threaded shaft 14 employed to provide a mechanism by which the present invention can be suspended in the desired position. This is typically accomplished by the use of a swivel apparatus (not illustrated) which is configured so that one portion of it is capable of freely spinning while the remainder remains stationary. The use of the swivel enables the present invention to be securely mounted to while being capable of rotating independently.

As stated previously, the turbine arms 20 form the outer shell 11 of the present invention. The turbine arms 20 themselves are made up of three distinct areas. The first of these is the lower arms 32 which extend upwards and diagonally outwards from the base 26 at the lower confluence 24 thereby expanding the interior space 13 going upwards. Additionally, at the lower arms 32, the strips making up the turbine arms 20 are oriented so that their flat lower inside surfaces and their lower outside surfaces face inwardly and outwardly with respect to the overall orientation of the present invention. This configuration results in an outer shell 11 that rapidly expands in a lineal fashion from the base 26 through the extent of the lower arms 32 to open up the interior space 13 as quickly as possible.

The middle section of the turbine arms 20 are made up of the wind surfaces 30. The wind surfaces 30 are the portions of the turbine arms 20 that contain most of the bend incorporated into them in the cutting process and also include the twists that alter the orientation of its flat sides in relation to the interior space 13. It is this alteration of the orientation of the wind surfaces 30 which provides the wind driven rotation of the present invention that is one of its principle attributes. In the wind surfaces 30, the turbine arms 20 are twisted in such a manner so that their outside surface is rotated in terms of its orientation to the interior space 13 so it eventually reverses its position with their inside surfaces at the upper end of the wind surfaces 30. This twisting of the turbine arms 20 along with the curved portions established at cutting result in the wind surfaces' 30 inside and outside surfaces being positioned with respect to the interior space 13 so that they can easily be engaged by any wind that the present invention is exposed to. Thus, the wind surfaces 30 of the turbine arms 20 provide the rotational ability to the present invention. Additionally, the wind surfaces 30 enclose the central portion of the interior space 13 in a ball-like configuration and accounts for the bulk of the interior space 13. Finally, the wind surface 30 portions of the turbine arms 20 also serve to define the central and widest portion of the present invention thereby ensuring the exposure of the maximum possible surface area of the turbine arms 20 at all times.

Above the wind surfaces 30, the upper arms 28 of the turbine arms 20 complete the enclosure of the interior space 13 at their terminus at the upper confluence 22. The important thing to recognize at this point is that what was once the outside surface of the wind surfaces 30 has become their upper inside surfaces in the upper arms 28. Conversely, the same reversal occurs with the wind surfaces' 30 inside surface which changes to their outside surface at the upper arms 28. This is the twisting characteristic of the turbine arms 20 provides the turbine function and appearance that define the present invention.

The interior space 13 of the present invention provides for the positioning of central design elements 34 which serve to enhance its overall aesthetic appeal. The central design element 34 can consist of any number of configurations and images so long as they fit within the interior space 13 in a pleasing manner. One of the most common designs is a hollow outer ring 36 that is suspended below the upper confluence 22 by the use of the attachment plate 38. The upper surface of the attachment plate 38 is simply positioned between the lower nut 18 and the lower surface of the upper confluence 22 in the assembly process. This allows for the insertion of any number of central design elements 34 into the interior space 13 of the present invention which serves to enhance its overall appeal.

The outer ring 36 of the central design element 34 encloses an additional amount of central space 41 which is then utilized to incorporate such images as the hummingbird element 40 which is illustrated in these FIGURES. Additionally, these FIGURES illustrate the use of the element base 42 which is a filled in section of the lower portion of the central space 41 within the outer ring 36. This element base 42 provides opportunities for the incorporation of additional design elements the most notable of which is the logo hole 44 allowing for the insertion of a company's logo into the design of the present invention.

Figure 4:
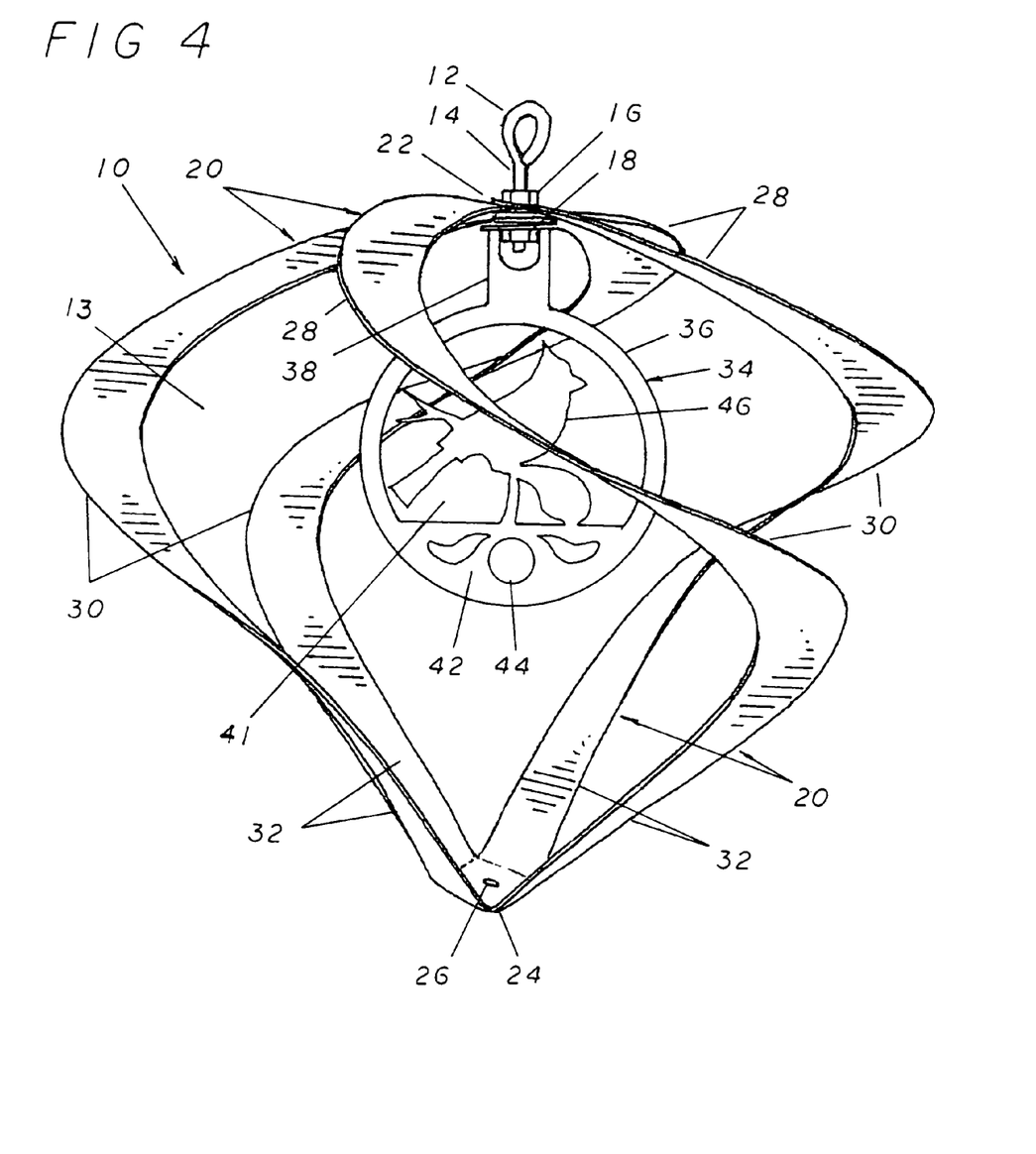
FIG. 4 is a perspective view of an alternative embodiment of the present invention in which the central design element is altered to replicate a cardinal.
Figure 5:
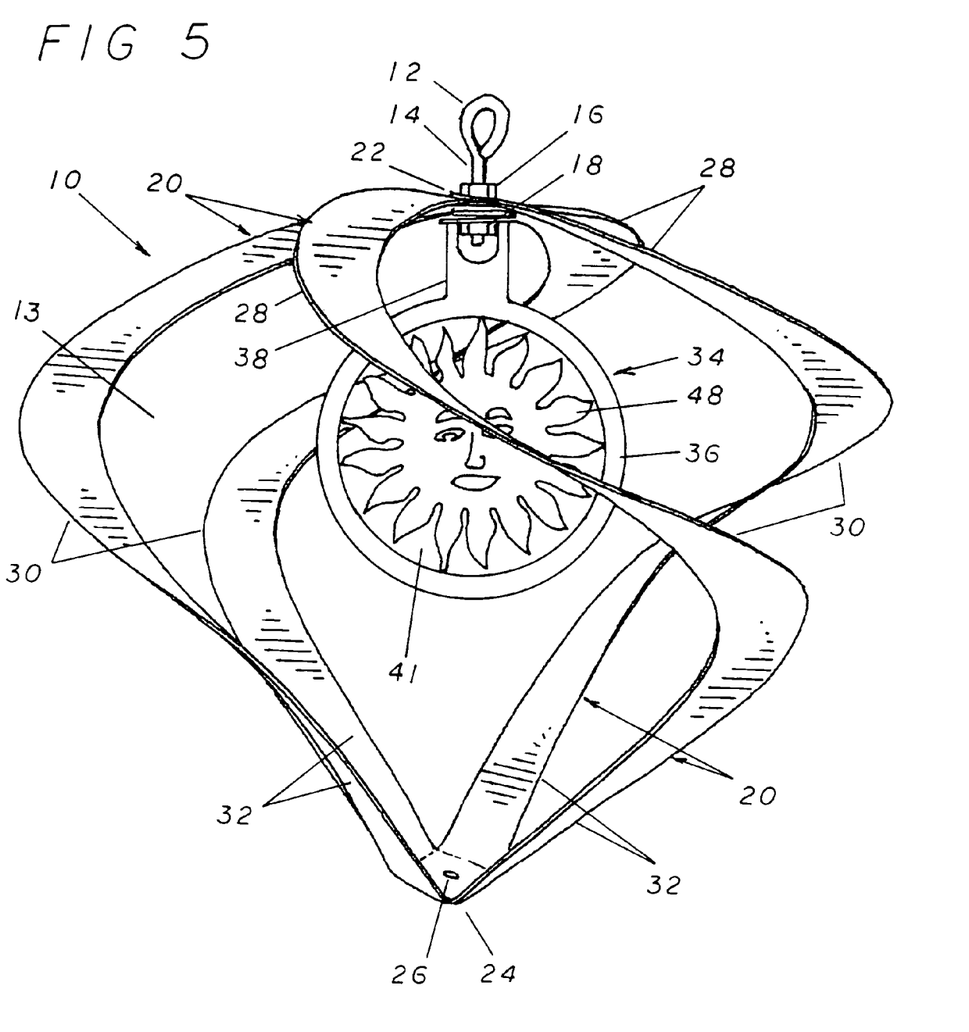
FIG. 5 is a perspective view of an additional alternative embodiment of the present invention in which the central design element is altered to replicate a smiling sun.

The central space 41 within the outer ring 36 can be used to incorporate any design element that lends itself to an expression in silhouette. An alternative embodiment of the present invention in which the central space 41 is filled with a cardinal element 46 is illustrated in FIG. 4. Note that this is a similar configuration as the previous embodiment in that the element base 42 and its associated components are retained. This configuration is the most common type use in the central design element 34 of the present invention. An additional embodiment of the present invention in which the central space 41 is filled with a sun element 48 is illustrated in FIG. 5. Note that the sun element 48 fills the entire central space 41 of the outer ring 36 requiring that the element base 42 be omitted from the ventral design element 34. In all other respects, this type of central design element 34 is exactly the same as described for the others.

Figure 6:
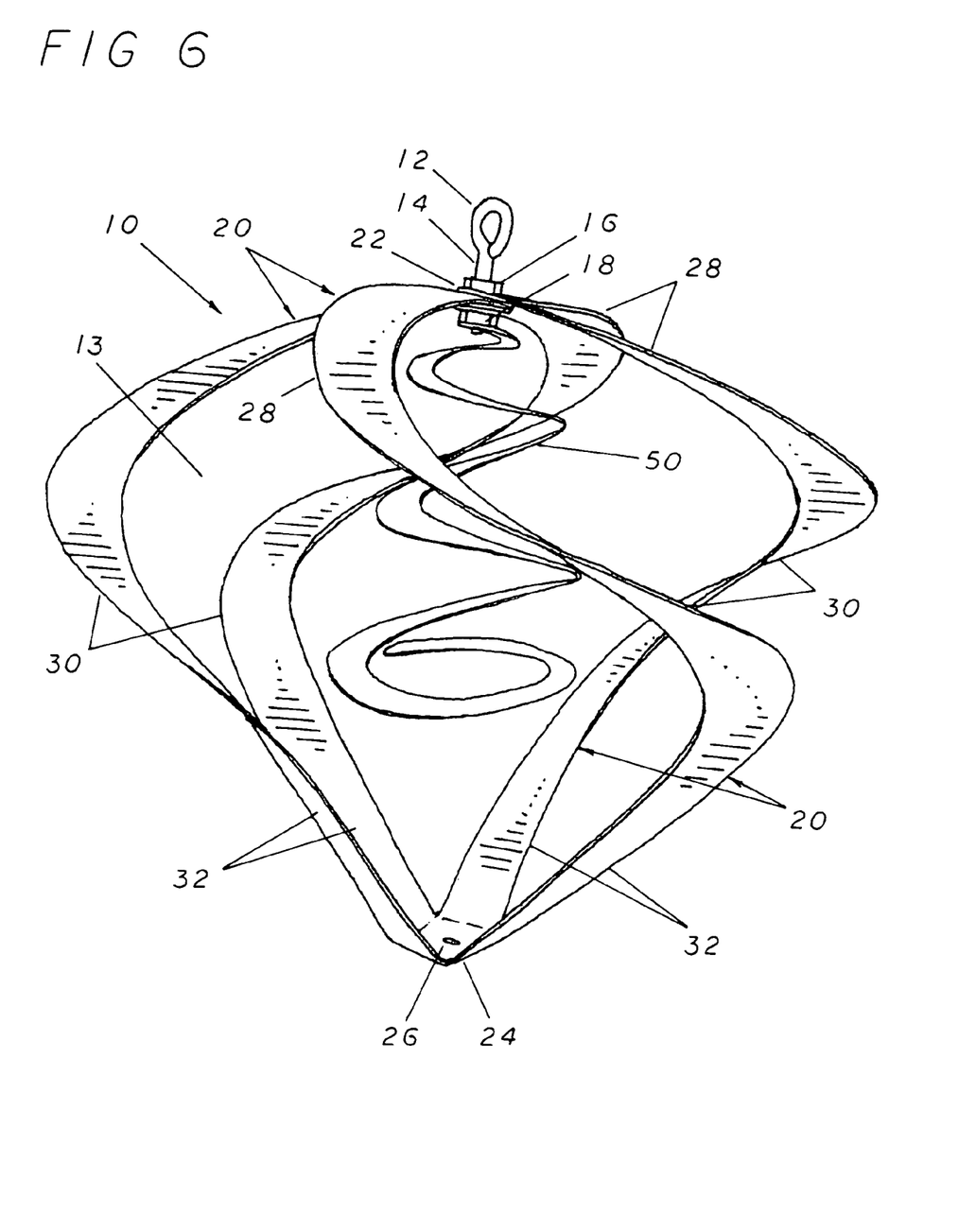
FIG. 6 is a perspective view of an alternative embodiment of the present invention in which the central design element is altered to replicate an additional twist element.

A still further embodiment of the present invention in which the central design element 34 has been entirely omitted and replaced with a spiral element 50 is illustrated in FIG. 6. It is important to note that although this FIGURE and description illustrate a spiral shape, any geometric shape suitable for such uses can be employed in this situation and the focus of the spiral element 50 is solely for the purposes of simplicity. The spiral element 50 is simply a descending twist of flat construction material that is attached to the upper confluence 22 in the same manner that was described for the central design element 34 above.

Although the present invention has been described in considerable detail with reference to certain preferred versions thereof, other versions are possible. Therefore, the spirit and scope of the appended claims should not be limited to the description of the preferred versions contained herein.

What is claimed is:

1. A wind turbine comprising:
   an upper and lower confluence section;
   a plurality of turbine arms extending upward and outward in a spiral fashion from said lower confluence to a central portion of said wind turbine, said turbine arms further extending upward and inward from said central portion in a spiral fashion so as to meet at said upper confluence, each of said turbine arms further defining a shaft hole such that each of said turbine arms shaft hole is lined up where said turbine arms meet at said upper confluence, said turbine arms defining an interior space; and
   a decorative plate section fixedly attached to said upper confluence and extending downward into said interior space.

2. A wind turbine as in claim 1 further comprising a hanging hook fixedly attached to said upper confluence extending upward from said upper confluence and having a threaded shaft extending downward through said shaft holes with a threaded nut.

3. A wind turbine as in claim 2 wherein said decorative plate section is circular plate section defining an inner design.

4. A wind turbine as in claim 3 wherein said turbine arms and said lower confluence is a single piece cut from a flat sheet.

5. A wind turbine as in claim 4 wherein there are four turbine arms.

6. A wind turbine as in claim 2 wherein said decorative plate section is a spiral section.

7. A wind turbine comprising:
   an upper and lower confluence section;
   a plurality of turbine arms extending upward and outward in a spiral fashion from said lower confluence to a central portion of said wind turbine, said turbine arms further extending upward and inward from said central portion in a spiral fashion so as to meet at said upper confluence, each of said turbine arms further defining a shaft hole such that each of said turbine arms shaft hole is lined up where said turbine arms meet at said upper confluence, said turbine arms defining an interior space;

a decorative section fixedly attached to said upper confluence and extending downward into said interior space; and a hanging hook having a threaded shaft portion extending downward through said shaft hole on said turbine arms and said decorative section so as to fasten said turbine arms and said decorative section together and form said upper confluence section.

8. A wind turbine as in claim 7 wherein said hanging hook extends upward from said upper confluence.

9. A wind turbine as in claim 8 wherein said decorative section is a circular plate section defining an inner picture element.

10. A wind turbine as in claim 8 wherein said decorative section is a spiral section.

11. A wind turbine as in claim 8 wherein turbine arms and said lower confluence is a single piece cut from a flat sheet.

12. A wind turbine as in claim 11 wherein there are four turbine arms.

13. A wind turbine comprising:

an upper and lower confluence section;

a plurality of turbine arms extending upward and outward in a spiral fashion from said lower confluence to a central portion of said wind turbine, said turbine arms further extending upward and inward from said central portion in a spiral fashion so as to meet at said upper confluence, each of said turbine arms further defining a shaft hole such that each of said turbine arms shaft hole is lined up where said turbine arms meet at said upper confluence, said turbine arms defining an interior space and said turbine arms and said lower confluence being a single piece cut from a flat sheet;

a decorative section fixedly attached to said upper confluence and extending downward into said interior space; and a hanging hook having a threaded shaft portion extending downward through said shaft hole on said turbine arms and said decorative section so as to fasten said turbine arms and said decorative section together and form said upper confluence section.

14. A wind turbine as in claim 13 wherein said hanging hook extends upward from said upper confluence.

15. A wind turbine as in claim 14 wherein there are four turbine arms.

16. A wind turbine as in claim 15 wherein said decorative section is a circular plate section defining an inner picture element.

17. A wind turbine as in claim 15 wherein said decorative section is a spiral section.

* * * * *